US012756201B2

(12) United States Patent
Kim et al.

(10) Patent No.: US 12,756,201 B2
(45) Date of Patent: Oct. 6, 2026

(54) VOLTAGE CONTROL DEVICE FOR SOLAR POWER GENERATION IN ACCORDANCE WITH OUTPUT LIMIT

(71) Applicant: CROCUS INC., Seoul (KR)

(72) Inventors: Bok Nyun Kim, Seoul (KR); Daniel Jesuph Lim, Seoul (KR)

(73) Assignee: CROCUS INC., Seoul (KR)

( * ) Notice: Subject to any disclaimer, the term of this patent is extended or adjusted under 35 U.S.C. 154(b) by 0 days.

(21) Appl. No.: 19/311,406

(22) Filed: Aug. 27, 2025

(65) Prior Publication Data

US 2026/0066667 A1 Mar. 5, 2026

(30) Foreign Application Priority Data

Aug. 30, 2024 (KR) ........................ 10-2024-0117735

(51) Int. Cl.

*G05F 1/67* (2006.01)
*H02J 3/38* (2006.01)
*H02J 101/24* (2026.01)

(52) U.S. Cl.

CPC ................ *H02J 3/381* (2013.01); *G05F 1/67* (2013.01); *H02J 2101/25* (2026.01)

(58) Field of Classification Search

CPC ...... G05F 1/66; G05F 1/67; G05F 1/70; H02J 3/381

See application file for complete search history.

(56) References Cited

U.S. PATENT DOCUMENTS

2012/0139241 A1* 6/2012 Haj-Maharsi ......... F03D 7/0224 290/44
2019/0036340 A1* 1/2019 Meeker ................ G05B 13/027
2022/0263312 A1* 8/2022 Tsujii ................... G05B 19/042

* cited by examiner

*Primary Examiner* — Jayne L Mershon
(74) *Attorney, Agent, or Firm* — The PL Law Group, PLLC

(57) ABSTRACT

A voltage control device in an output limit situation of a solar power generation facility performs an algorithm to calculate output points adjacent to a limited output (PR) from the current output point of the solar power generation facility. The voltage control device may include a pattern calculation unit for calculating an output pattern comprised of the output points and a voltage adjustment unit for controlling the terminal voltage of the solar panel with the voltage of the final output point of the output pattern.

9 Claims, 15 Drawing Sheets

120

VOLTAGE CONTROL DEVICE FOR SOLAR POWER GENERATION IN ACCORDANCE WITH OUTPUT LIMIT

CROSS-REFERENCE TO RELATED APPLICATION AND CLAIM OF PRIORITY

This application claims the benefit under 35 USC § 119 of Korean Patent Application No. 10-2024-0117735, filed on Aug. 30, 2024, in the Korean Intellectual Property Office, the entire disclosure of which is incorporated herein by reference for all purposes.

BACKGROUND

1. Technical Field

The present invention relates to a voltage control device capable of consistently maintaining the output of a solar power generation facility in accordance with an output limit instruction by using an output pattern that includes a plurality of output points.

2. Background Art

With the rapid increase in renewable energy generation facilities, a phenomenon of output limitation is occurring due to surplus power in corresponding regions. Output limitation occurs frequently as the power supply exceeds demand. The number of output limitation instances is expected to increase as more renewable energy facilities are added.

Localized power surplus in the power grid is a factor that destabilizes the grid. To prevent this, solar power plants are often shut down, which leads to conflicts.

Consequently, countries advanced in distributed energy are introducing negative power generation tariffs to impose penalties on excess supply, thereby encouraging solar power plants to balance power supply and demand on their own.

SUMMARY

To solve the above problem, instead of always generating power at maximum output for maximum efficiency, the present invention provides a voltage control device for solar power generation that can operate flexibly according to market demand or in response to an output limit command from a higher-level system, thereby generating as much power as the system requires.

The voltage control device of the present invention performs an algorithm to calculate an output point adjacent to a limited output (PR) from the current output point of the solar power generation facility in an output limit situation. The voltage control device may include a pattern calculation unit for calculating an output pattern comprised of the output points and a voltage adjustment unit for controlling the solar panel terminal voltage to the voltage of the final output point of the output pattern.

The present invention can control the voltage of the solar power generation to become the limited output or a reference output in accordance with an output limit situation, thereby generating the power requested by the market or the grid.

As the number of repetitive voltage control iterations increases, the computation time for calculating the output point can be delayed.

Repetitive voltage control to obtain a limited output point not only slows down the convergence speed but can also cause power overshoot or undershoot in the solar power generation facility, which includes solar panels, converters, and inverters. Repetitive voltage control for obtaining a limited output point can also cause problems such as noise amplification or accumulation of tracking errors for the limited output point, which can ultimately become a factor in overloading the grid.

Therefore, the present invention can quickly calculate the limited output point by comparing output patterns, regardless of fluctuating illuminance or solar irradiance conditions in a situation of a sudden output limit request from the grid. Consequently, it can minimize factors that cause problems for the solar power facility, such as power overshoot or undershoot.

Furthermore, the present invention introduces a hysteresis band centered on the limited output, can set the width of that band to the maximum width that satisfies the limited output condition, and is configured to find the limited output point with a minimum number of calculations.

Subsequently, by adjusting the band width when a voltage corresponding to the limited output point is quickly obtained using an output pattern, the output pattern can be made more precise. As the output pattern becomes more precise, more accurate and rapid pattern calculation becomes possible during pattern comparison. As the pattern calculation is repeated, a more refined output pattern is formed, and as a result, output pattern data that is most optimized for the corresponding solar power generation facility can be secured.

Conventional methods employ various algorithms to obtain output points included in a PV curve to find a limited output point. In the conventional case, when faced with an output limit situation, the calculation to find the limited output point is repeated each time.

However, the present invention calculates the limited output point based on a previously calculated output pattern that includes output points, thereby reducing the time or the number of iterations required to calculate the voltage corresponding to the limited output point.

The output pattern of the present invention can be a graph comprised of nodes and edges or a polygon comprised of vertices and sides. If the most similar pattern is found from such stored topological patterns and applied immediately, a considerably faster response is possible compared to calculation by other algorithms.

Moreover, by adding a newly calculated output point to the previously calculated output pattern, the pattern becomes progressively more refined as the pattern calculation is repeated, thus the speed of finding the limited output point can be further increased.

BRIEF DESCRIPTION OF THE DRAWINGS

FIG. 6A is a graph comprised of nodes and edges, and FIG. 6B is a polygon comprised of vertices and sides.

DETAILED DESCRIPTION OF THE INVENTION

Hereinafter, the voltage control device and voltage control method for a solar power generation facility in an output limit situation of the present invention will be described with reference to FIGS. 1 to 15.

Figure 1:
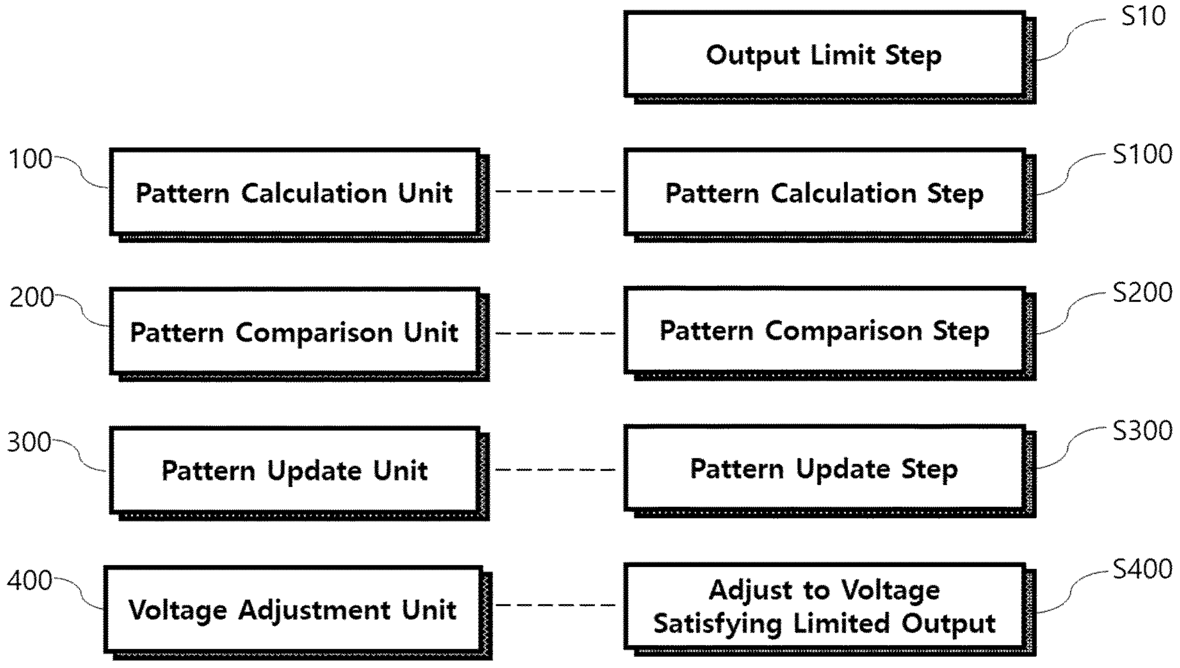
FIG. 1 is an explanatory diagram of the voltage control device and voltage adjustment method for solar power generation of the present invention.

In FIG. 1, the voltage control device of the present invention may include at least one of a pattern calculation unit (100), a pattern comparison unit (200), a pattern update unit (300), a voltage adjustment unit (400), and a control unit (500).

The voltage control method of the present invention may include at least one of an output limit step (S10), a pattern calculation step (S100), a pattern comparison step (S200), a pattern update step (S300), and a voltage adjustment step (S400).

The present invention controls the voltage of the solar power generation to become the limited output or a reference output (PR) to avoid penalties in an output limit situation, thereby allowing it to generate the power requested by the market or the power grid. Here, the output limit situation in the output limit step (S10) can be a case where the voltage control device voluntarily adjusts the voltage according to market demand or predictions, or a case where an output limit command is issued from a higher-level system such as a power management company.

Here, the limited output (PR) is the limited output value according to the output limit command, and the reference output (PR) can be the control value of the solar power generation facility corresponding to the output limit situation. Hereinafter, limited output and reference output may be used interchangeably.

To flexibly respond to market demand, the present invention allows for flexible power generation in an output limit situation, including an output limit command from a higher-level system or according to market demand, rather than always generating power at maximum output. For example, if it is not an output limit situation such as an output limit command, the present invention performs voltage control (VM) so that the solar power generation facility produces the maximum output (PM). When it becomes an output limit situation, it can perform voltage control (VR) so that it produces the limited output (PR). In this case, the current output point (e.g., A1 or P1) is the maximum power point (PM), but it is not limited to this.

In the pattern calculation step (S100), the pattern calculation unit (100) can calculate an output pattern (120) by calculating output points that approach the limited output point from the current output point in the output limit situation (S10).

In the pattern comparison step (S200), the pattern comparison unit (200) can mutually compare output patterns (120) that include output points to calculate the most similar output pattern (120).

In the pattern update step (S300), the pattern update unit (300) can update the output pattern (120) to be more precise and accurate by adding output points based on a previously stored output pattern (120). Here, 'more precise or accurate' means that it matches more closely with the actual power-voltage graph, which is a unique characteristic of the corresponding solar power generation facility.

This update of the output pattern (120) can be associated with the adjustment of the width (ΔL) of a hysteresis band centered on the limited output or reference output (PR).

In the voltage adjustment step (S400), the voltage adjustment unit (400), based on the output pattern (120) obtained in the pattern calculation step (S100), the pattern comparison step (S200), or the pattern update step (S300), can control the solar power generation facility to the voltage (VR) that satisfies the limited output (PR).

Here, the voltage of the solar power generation facility can be the terminal voltage connected to the solar panel.

Figure 2C:
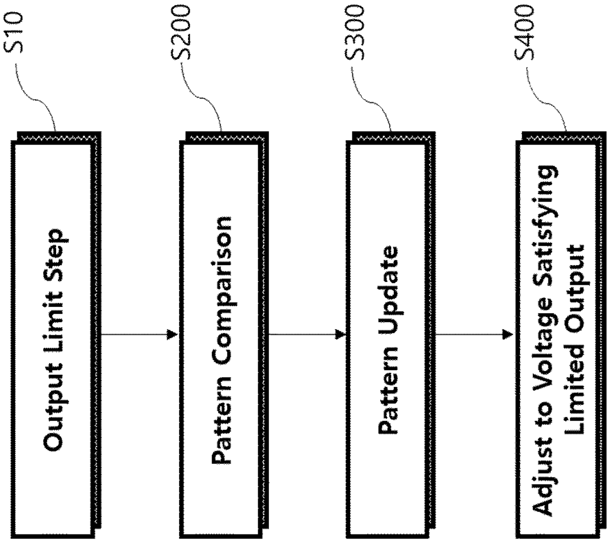
FIGS. 2A to 2C are embodiments of the voltage adjustment method of FIG. 1.
Figure 2B:
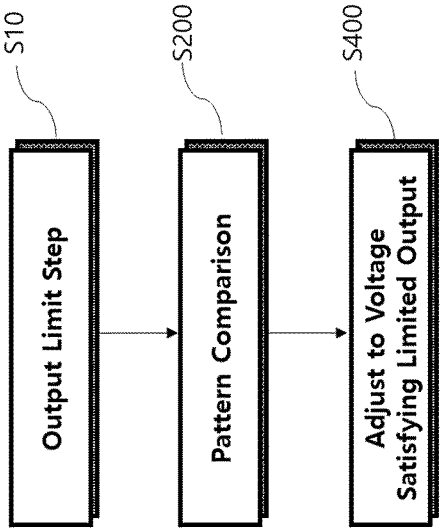
Figure 2A:
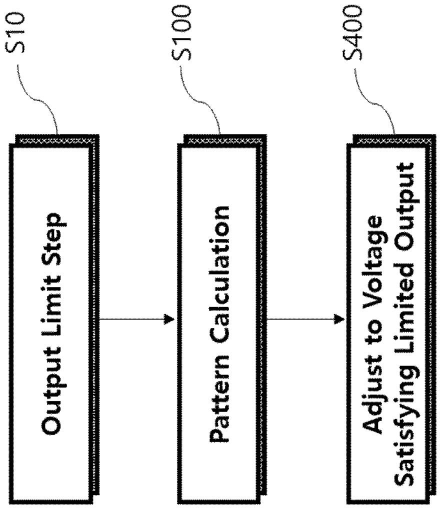

In FIGS. 2A to 2C, embodiments (FIG. 2A) through (FIG. 2C) of the voltage adjustment method of the present invention are disclosed.

In FIG. 2A, in an output limit situation, a limited output (PR) can be commanded or set (S10). The control unit (500) may set the limited output (PR) according to an output limit command or voluntarily set a reference output (PR) based on market demand.

The pattern calculation unit (100) performs an algorithm to calculate output points adjacent to the limited output (PR) from the current output point, and can calculate an output pattern (120) comprised of these output points (S100).

If one of the output points (e.g., the final output point) in the pattern calculation unit (100) satisfies the limited output (PR), the algorithm is stopped, and the voltage adjustment unit (400) can be adjusted to the limited voltage (VR) that satisfies the corresponding limited output (PR) (S400).

Specifically, the voltage adjustment unit (400) controls the terminal voltage of the solar panel with the voltage of the final output point of the output pattern (120). In cases where the output point is calculated and the final output point exactly corresponds to the limited output (PR), it will be adjusted to the limited voltage (VR). However, if a hysteresis band is set and the final output point belongs to the band, it is considered to satisfy the limited output (PR) condition, and in this case, the final voltage can be adjusted with the voltage of the final output point (S400).

In FIG. 2B, in an output limit situation where a limited output (PR) is commanded or set (S10), if a previously calculated output pattern (120) for the current specific solar irradiance (I) or limited output (PR) parameter condition is stored, the pattern comparison unit (200) can present that output pattern (120) (S200).

The voltage adjustment unit (400) can use the previously calculated output pattern (120) to immediately adjust the voltage of the solar power facility to the voltage of the final output point or the limited voltage (VR) (S400).

In the embodiment (FIG. 2B), unlike embodiment (FIG. 2A), the time consumed for pattern calculation (S100) is not spent, so a fast response up to voltage control is possible.

For example, conventional methods for output point calculation, such as the P&O (Perturb and Observe) algorithm, IC (Incremental Conductance) algorithm, and Maximum Power Point Tracking (MPPT) methods, basically have a trade-off relationship of mutual advantages and disadvantages in the process of calculating the output point, and there are many methods that minimize disadvantages in specific situations. Therefore, the approach of the present invention, which uses the previously calculated output points that form an output pattern (120) to find a similar pattern through pattern comparison and shortens the calculation process, is fundamentally different from other conventional algorithms.

This is also linked to recently developing AI technology. Previously, the task of recognizing patterns like images or shapes and storing and mutually comparing vast amounts of data took longer than calculating the output point under specific parameter conditions. However, due to the recent rapid development of deep learning, machine learning, and AI technologies, the computation time required for mutual comparison between the output patterns (120) of the present invention can be drastically reduced. In addition, since the constant output control using the output pattern (120) of the present invention finds the voltage corresponding to the limited output (PR) based on past big data, the calculation result is also included in the big data, and the process of calculating the voltage corresponding to the next limited output (PR) is updated to be more accurate/precise, and the computation speed can be further accelerated.

Meanwhile, if pattern comparison (S200) is performed but a same/similar output pattern (120) is not matched, the calculation of the output pattern (120) by the pattern calculation unit (200) can be performed (S100). The case of performing pattern calculation (S100) will be frequent when not much time has passed since the installation of the solar power generation facility. When a considerable amount of time has passed since installation, the probability of a similar output pattern (120) being matched will gradually increase, so the time it takes to calculate the limited voltage (VR) can be gradually shortened as the voltage control device of the present invention operates.

In this aspect, shortly after the construction of the solar power generation facility, the frequency of pattern calculation (S100) as in embodiment (FIG. 2A) will be high. As the facility's operating time passes, the frequency of acquiring the limited output point (VR) (or the final output point corresponding to it) through pattern comparison (S200) as in embodiment (FIG. 2B) may increase.

In FIG. 2C, the control unit (500) can set a limited output or reference output in an output limit situation (S10). The relationship between pattern comparison (S200), voltage adjustment (S400), and pattern calculation (S100) is similar to what was described above, and a pattern update (S300) to expand/advance the output pattern (120) can be added after the pattern comparison (S200).

The pattern update unit (300) can add an output point to the corresponding previously calculated output pattern (120) using a previously calculated output pattern (120) that corresponds to the parameter conditions of the current situation (e.g., specific solar irradiance (I), commanded or set limited output (PR)).

The added output point may be an output point closer to the limited output point (VR, PR) than the output points of the previously calculated output pattern (120).

Furthermore, the pattern update unit (300) can be associated with a hysteresis band centered on the limited output (PR). It can induce the calculation of a new output point from an existing output pattern (120) by varying the hysteresis band width (ΔL) for the output pattern (120).

Figure 3:
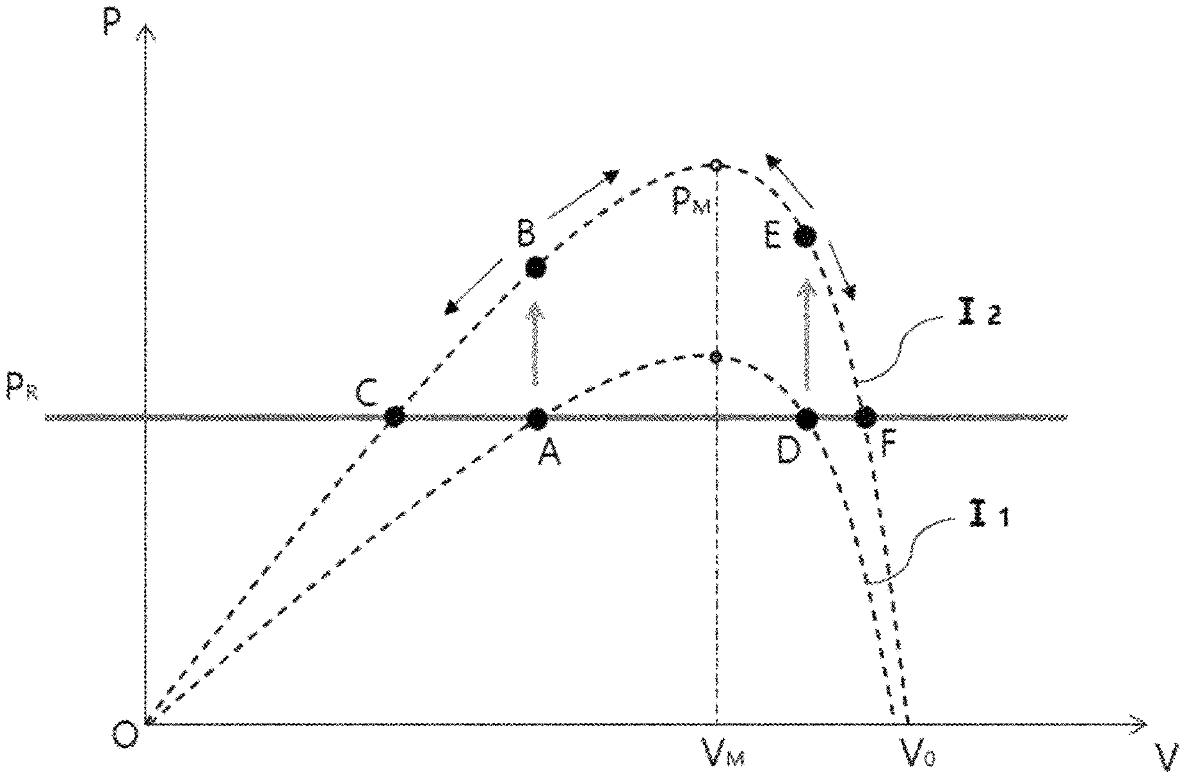
FIG. 3 is an explanatory diagram of the change in the output limit point according to the change in solar irradiance in the voltage control device of the present invention.

According to FIG. 3, the PV graph of the solar power generation facility can change depending on the solar irradiance (I). The controlled voltage for the same limited output or reference output (PR) may differ.

Hereinafter, in the PV graph of the solar power generation facility, P can be the power of the solar power generation facility or the power of the solar panel, and V can be the voltage of the solar power generation facility, the voltage of the solar panel, or the control voltage commanded by the voltage adjustment unit (400). PR can be the limited output or the reference output corresponding to the limited output.

PM and VM can be the maximum power and the voltage corresponding to the maximum power (maximum voltage), respectively, under the current specific parameter conditions. Here, the parameter conditions may include the solar irradiance (I) irradiated on the solar panel or the unique electrical/chemical characteristics of the solar power generation facility's infrastructure. For example, if the facility infrastructure is comprised of a solar panel, converter, inverter, etc., their electrical/chemical characteristic values may be included.

VR can be the limited voltage corresponding to the limited output (PR) or the reference voltage corresponding to the reference output (PR).

Vo can be the open-circuit voltage (Voc), which is the voltage when no current flows. The open-circuit voltage (Vo) can be measured when the output terminal of the solar panel or solar power generation facility is in an open state.

The open-circuit voltage (Vo) can be determined by temperature or the configuration or materials of the solar power generation facility. The open-circuit voltage (Vo) may increase as the temperature increases and decrease as the temperature decreases, and it may have a higher value at higher solar irradiance.

Accordingly, the open-circuit voltage (Vo) can vary in value with changes in solar irradiance, unlike the origin (0). Since the value of the open-circuit voltage (Vo) can be specified under the corresponding solar irradiance condition/temperature, the open-circuit voltage (Vo) can be used as one of the reference points of the output pattern (120).

When adjusting the voltage (V) of the solar power generation facility with the voltage corresponding to the limited output (PR), the main parameters may include the limited output (PR) or the solar irradiance (I).

According to FIG. 3, a limited output (PR) is commanded or set (S10). Under the current condition of the first solar irradiance (I1), the solar power generation facility can be voltage-controlled to the output points A and D that satisfy the limited output (PR).

If the solar irradiance increases to a second solar irradiance (I2), the power (P) from the voltages of output points A and D changes to output points B and E, which are not the limited output (PR). The voltage corresponding to the limited output (PR) changes from the voltage of output points A and D (the intersection points of the PV graph at the first solar irradiance (I1) and the limited output (PR)) to the voltage of output points C and F (the intersection points of the PV graph at the second solar irradiance (I2) and the limited output (PR)).

Therefore, it becomes necessary to calculate the output points C and F that satisfy the limited output (PR) again at the newly changed solar irradiance (I2). Or, it may be necessary to calculate the final output point, which is the closest output point to C and F that satisfies the output limit condition.

At this time, one can find the voltage of output point C or F by methods such as repeatedly obtaining output points that approach output point C from output point B. Similarly, one can find the voltage of output point C or F by methods such as repeatedly obtaining output points that approach output point C or F from output point E.

Tracking one of the output points that satisfy the limited output (PR), and, for example, tracking one of the output points that satisfy the limited output (PR) again when there is a change in conditions such as a change in solar irradiance, can be determined in the pattern calculation (S100) step, which is an algorithm for calculating output points.

For example, when using the intersection of a straight line passing through a reference point, the origin (0) of the output pattern (120), and an output point, with the limited output line (PR) as the basis for calculating a new output point, output points B and E will calculate output points that approach output point C. Also, when using the intersection of a straight line passing through a reference point, the open-circuit voltage (Vo) of the output pattern (120), and an output point, with the limited output line (PR) as the basis for calculating a new output point, output points B and E will calculate output points that approach output point F.

Using FIGS. 4A to 7, the output pattern (120) of the present invention will be described.

Figure 4A:
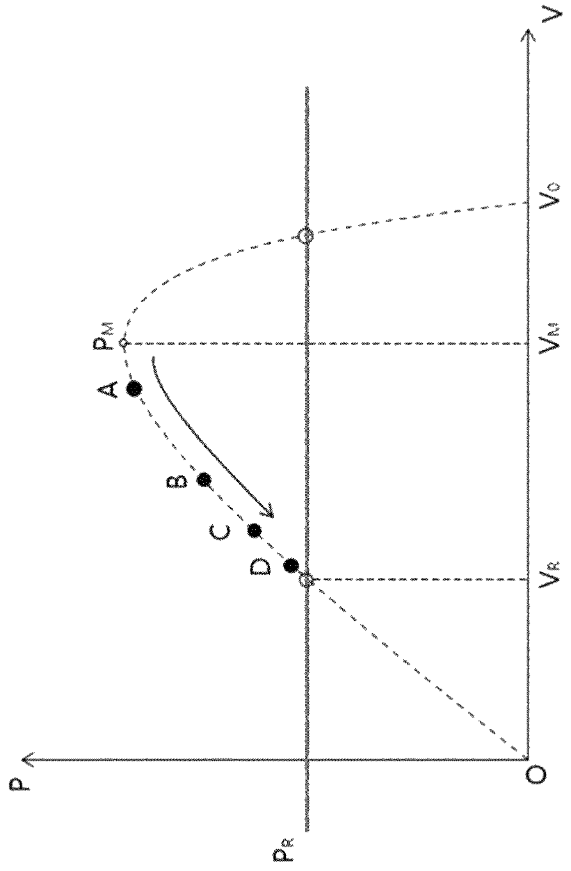
FIGS. 4A and 4B are an explanatory diagram of voltage adjustment to the output limit point in the present invention, for the case where the output pattern includes the origin (FIG. 4A) and the case where it includes the open-circuit voltage (FIG. 4B).
Figure 4B:
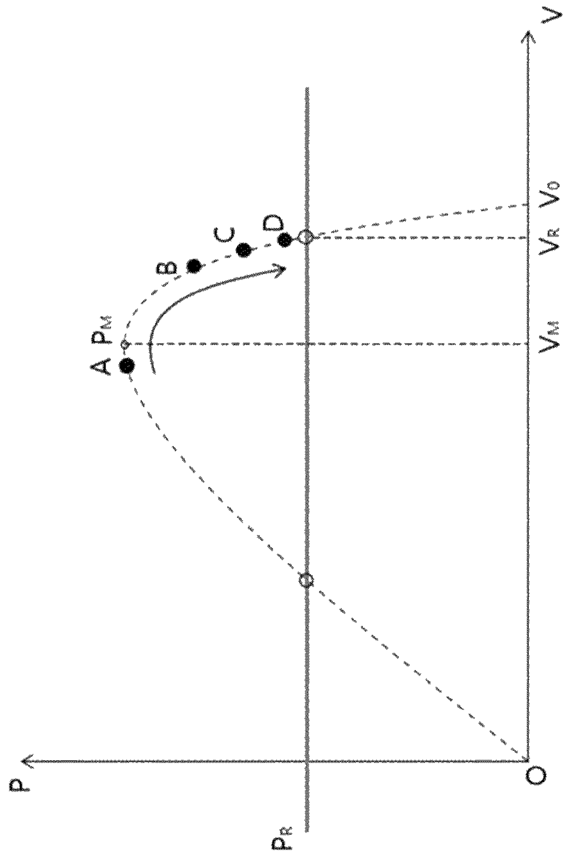
Figure 5B:
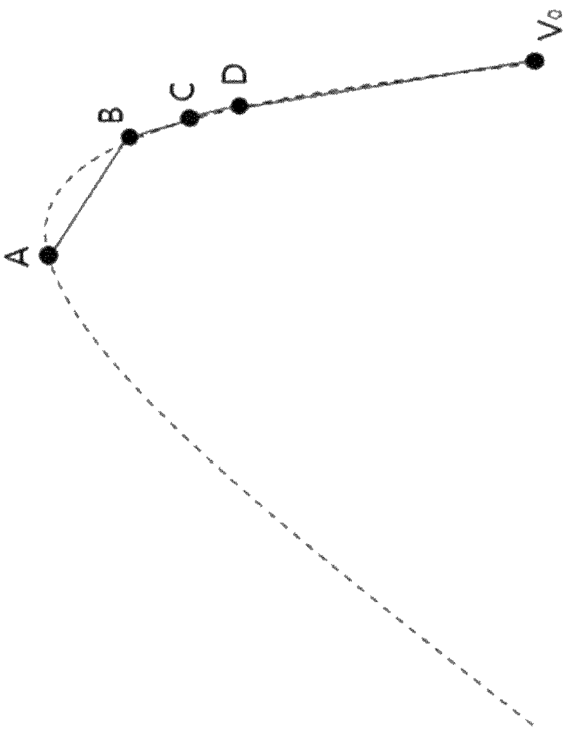
FIGS. 5A and 5B are an explanatory diagram of an output pattern comprised of output points obtained according to the voltage adjustment of the present invention.
Figure 5A:
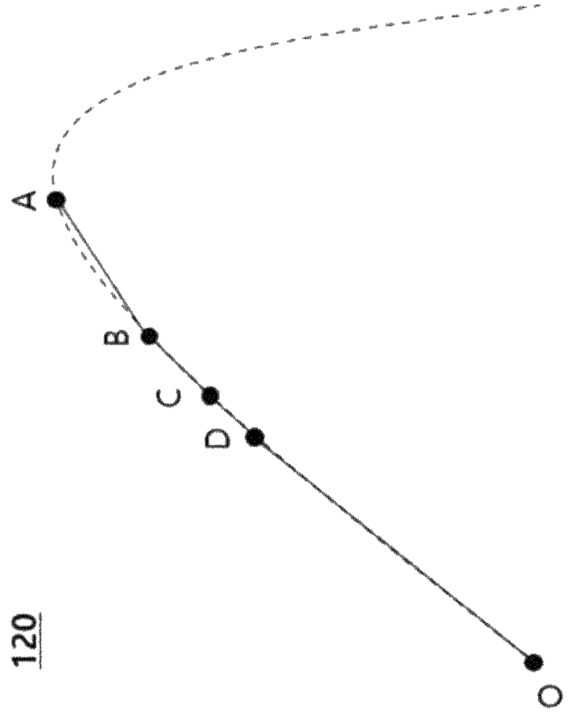

In FIGS. 4A and 4B, when a limited output (PR) is commanded or set in an output limit situation from a current output point (A), output points B, C, D are calculated, and the voltage can be sought to be close to the limited output point (VR, PR). FIG. 4A is an embodiment that takes the voltage with the lower voltage among the voltages satisfying the limited output (PR) from the current output point (A) as the limited output point, and FIG. 4B is an embodiment that takes the voltage with the higher voltage as the limited output point.

According to FIGS. 5A to 6B, the output pattern (120) can be comprised of output points (A, B, C, D) or a reference point as constituent elements, and the reference point can be a reference point used by the algorithm for calculating output points. In the case of FIGS. 5A, 5B, 6A and 6B, the origin (0) or the open-circuit voltage (Vo) is the reference point.

Using the current output point (A) and the reference point on the left or right side of the graph, the output points (B, C, D) that are closest to the limited output (PR) can be calculated, and these can become the constituent elements of the output pattern (120).

The pattern calculation unit (100) can use an algorithm that gradually approaches the limited output (PR) while moving from the current output point (A) to the final output point (D). The number of output point calculations required to reach the limited output (PR) may vary depending on the algorithm used.

In this case, it indicates that 3 calculations for output points B, C, D have been performed. If output point D reaches the limited output (PR) or satisfies the limited output (PR) condition (for example, if the power and voltage of output point D are sufficient to achieve the purpose of the commanded or set limited output (PR)), the output point calculation may be stopped. The voltage adjustment unit (400) can adjust the voltage of the solar power generation facility or solar panel to the voltage of the last final output point (D).

The pattern calculation unit (100) can calculate an output pattern (120) with these output points and the straight lines connecting the output points as constituent elements.

Figure 6B:
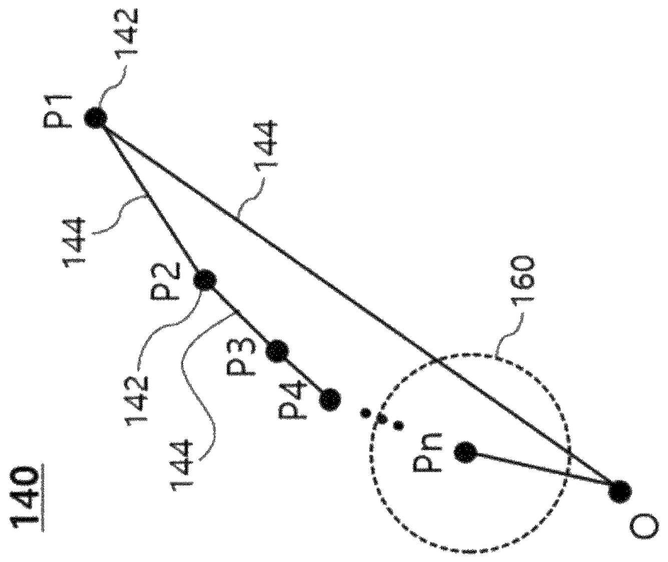
FIGS. 6A and 6B show embodiments of the output pattern of FIGS. 5A and 5B, where
Figure 6A:
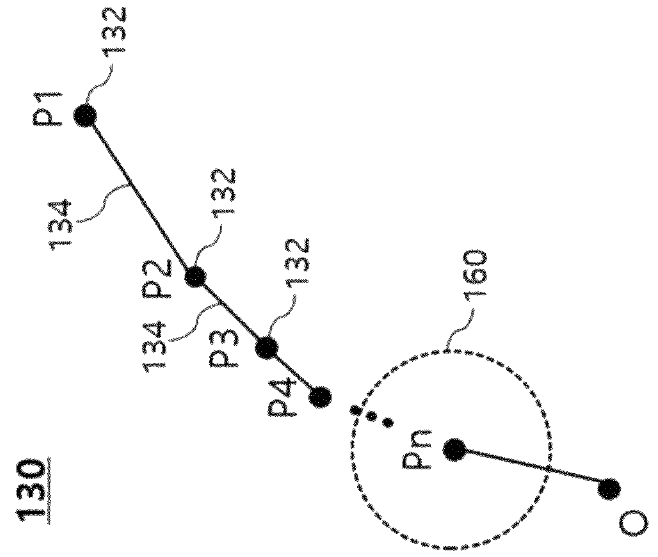

In FIGS. 6A and 6B, embodiments of the output pattern (120) are disclosed, where FIG. 6A shows the case of a graph (130), and FIG. 6B shows the case of a polygon (140).

The graph (130) can have a node (132) and an edge (134) connecting the nodes (132) as constituent elements. An output point can be a node (132). For example, the graph (130) can be a pattern that continuously connects a reference point (e.g., 0 or Vo), the current output point (P1), and the output points (P2, P3, P4, . . . . Pn) between the reference point and the current output point (P1).

The polygon (140) has a vertex (142) and a side (144) connecting the vertices (142) as constituent elements, and an output point can be a vertex (142). For example, the polygon (140) may include the side (144) connecting the reference point (0) and the current output point (P1) in the graph (130).

The pattern comparison unit (200) can compare the output patterns (120) under a specific parameter condition (e.g., a certain solar irradiance (I)) to find the most similar output pattern (120).

In one embodiment, the pattern comparison unit (200) can compare the output patterns (120) by concentrating more on the adjacent region (160) of the final output point (Pn). The current output point (P1) can be the maximum power point (MPP) when an output limit situation occurs during maximum output of solar power generation, and control is performed to a limited output point. The current output point (P1) can be the first limited output point when changing from a first output limit situation (e.g., a first solar irradiance (11)) to a second output limit situation (e.g., a second solar irradiance (12)). Therefore, the current output point (P1) can be dynamic depending on the current situation of solar power generation. The closer the current output point (P1) is to the final output point (Pn), the higher the possibility of showing the unique characteristics of the output pattern (120).

Therefore, looking at the features of the present invention related to the output pattern (120) in detail, each solar power facility is given a unique Power (P)-Voltage (V) curve, and the PV curve includes a plurality of output points, which are the solar power (P) values for each solar voltage (V). The main purpose of the present invention is to find the output point (limited output point or reference output point) corresponding to the commanded limited output or the set reference output (PR), and to control it to the voltage (limited voltage or reference voltage) of that output point.

In an undesirable comparative embodiment, the increase in the number of repetitive voltage control iterations can delay the computation required to calculate the limited output point. Repetitive voltage control to obtain the limited output point (VR, PR) not only slows down the convergence speed but also can cause power overshoot or undershoot of the solar power generation system including converters and inverters. Repetitive computation can also cause problems such as noise amplification and accumulation of output point tracking errors, which can ultimately become a factor in overloading the grid.

In comparison to this, the present invention can quickly calculate the limited output point (reference output point) (VR, PR) despite fluctuating illuminance or solar irradiance conditions (I) in a situation of a sudden output limit request from the grid. Therefore, problems that can be imposed on the solar power facility, such as power overshoot or undershoot, can be minimized.

In an undesirable comparative embodiment, in the case of various algorithms that obtain output points included in the PV curve to find a conventional limited output point (VR, PR), when faced with an output limit situation, the calculation to find the limited output point (VR, PR) is repeated each time. In comparison to this, the present invention is characterized by calculating the limited output point (VR, PR) based on a previously calculated output pattern (120) that includes output points, thereby significantly reducing the time or the number of iterations required to calculate the voltage (VR) corresponding to the limited output point.

That is, the output pattern (120) can be a pattern such as a graph (130) comprised of a node (132) and an edge (134), or a polygon (140) comprised of a vertex (142) and a side (144). If the most similar pattern is found from such a stored topological pattern (120) and applied immediately, a considerably faster response is possible compared to calculation by other conventional algorithms, and its accuracy is also reliable.

The present invention adds a newly calculated output point to a previously calculated output pattern (120), so the pattern (120) becomes progressively more refined as the computation is repeated. Therefore, the speed of finding the limited output point (VR, PR) can be further increased (S300).

Figure 7:
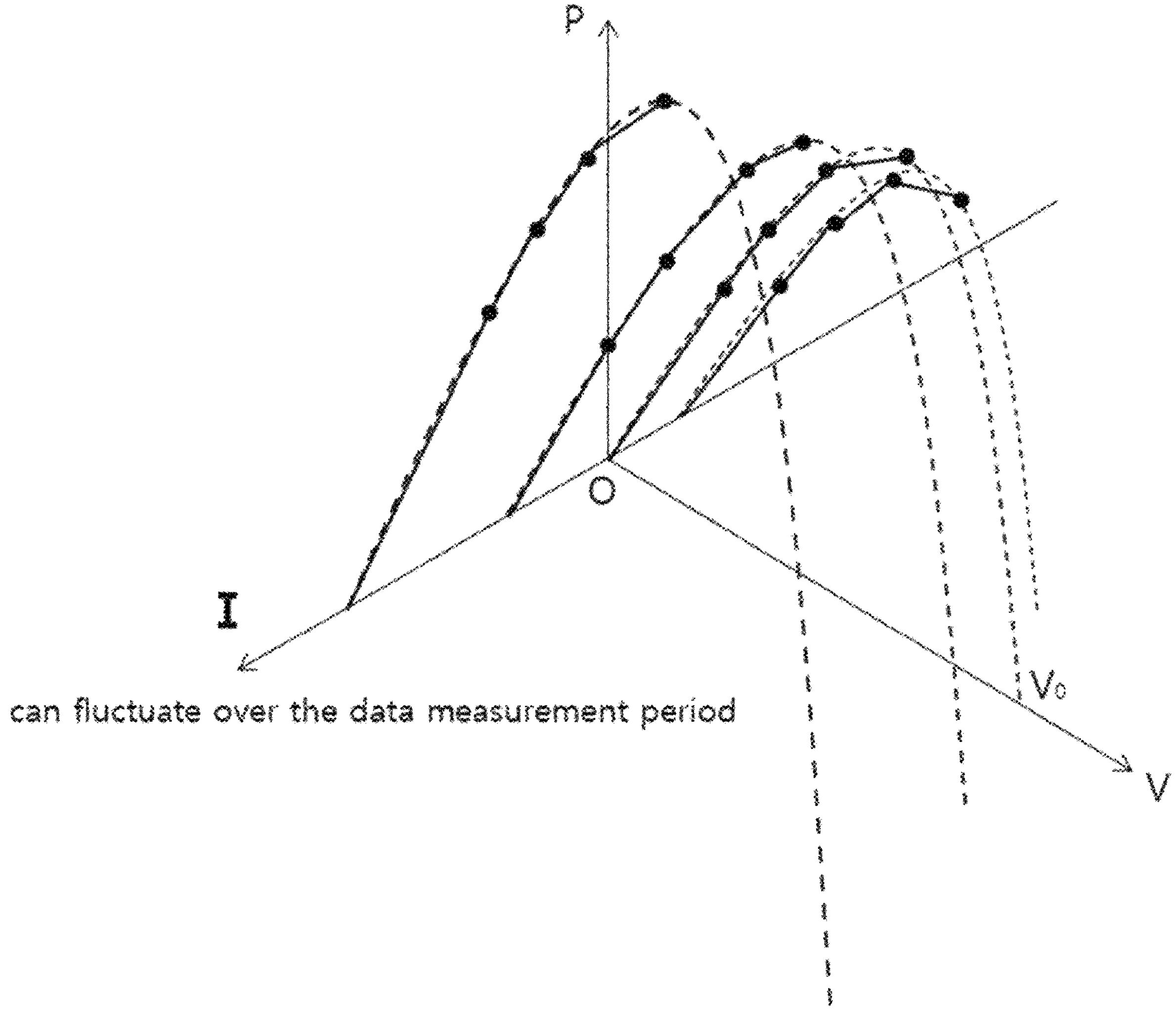
FIG. 7 is an embodiment of the output pattern of FIGS. 5A and 5B, showing a case expanded to a 3-dimensional Power (P)-Voltage (V)-Solar Irradiance (I) space.

According to FIG. 7, by adding parameter axes such as solar irradiance (I) and time (t) to the solar power generation facility's unique PV graph, the output pattern can be further expanded. For example, the output pattern (120) can form a 3D curved surface with Power (P)-Voltage (V)-Solar Irradiance (I) as axes.

The expanded output pattern (120) of the present invention can calculate the limited output point (VR, PR) more quickly and accurately, regardless of parameters such as the changing solar irradiance (I) or the limited output (PR) that affect the output pattern (120).

Furthermore, if the time (t) dependency of each parameter is added to the PVI curved surface, an output pattern (120) that changes with time (t) can be obtained. Since solar power facilities are often operated for periods of 10 years, 20 years, or more once installed, an output pattern (120) that represents the characteristics of the region where the solar power is installed can be obtained. Due to the characteristics of the present invention that the output pattern (120) becomes more refined as the operation time becomes longer, it is possible to reach the limited voltage (VR) more quickly. From this, the objective of ultimately reaching the limited voltage (VR) with a minimum of voltage control can be achieved.

Figure 8:
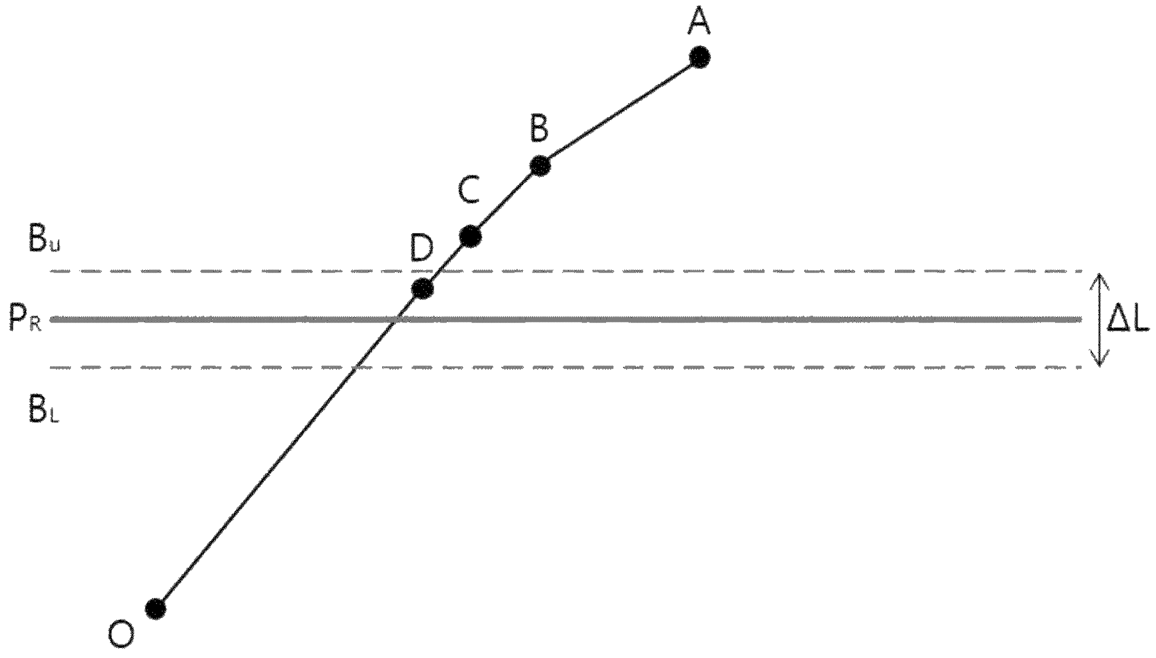
FIGS. 8 and 9 are explanatory diagrams of the hysteresis band centered on the limited output (reference output) of the present invention.
Figure 9:
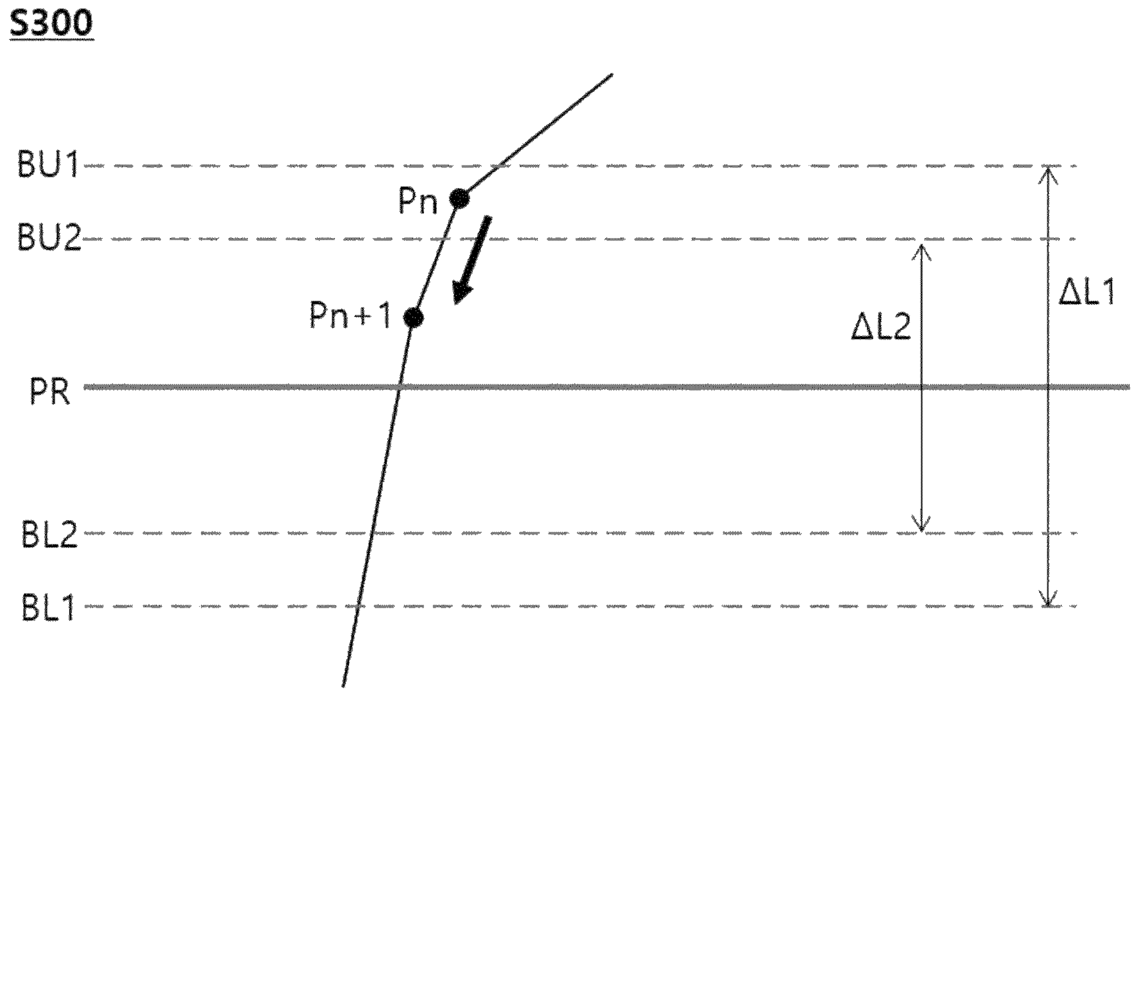

Referring to FIGS. 8 and 9, the hysteresis band of the present invention will be described.

Based on the current output point (A), a closer output point (D) to the limited output point (PR) is calculated. This output point calculation can be repeated until the output point reaches the limited output (PR) or a hysteresis band centered on the limited output.

The limited output (reference output) (PR) can be given as a specific value or as a band with a width. If the limited output (reference output) (PR) is given as a certain value, the output point calculation algorithm can quickly approach the vicinity of the limited output (PR). If an infinite convergence computation is repeated to become the limited output (PR), it may go against the purpose of the present invention, which is to reach the limited output point (PR) with a minimum of voltage control.

For this reason, a hysteresis band can be introduced. The hysteresis band is determined by the solar power generation facility that satisfies the limited output condition. For example, the width (ΔL) of the hysteresis band is set to the maximum width that satisfies the limited output condition, so that the limited output point is found with a minimum number of calculations.

Subsequently, even when the voltage (VR) corresponding to the limited output point is quickly obtained using the output pattern (120), by adjusting the band width (ΔL), the output pattern (120) can be made more refined. As the output pattern (120) becomes more refined, more accurate and rapid pattern calculation is possible during pattern comparison (S200). From this, as pattern calculation is repeated, a more refined output pattern (120) is formed, and as a result, output pattern data that is most optimized for the corresponding solar power generation facility can be secured.

According to FIG. 9, the pattern update unit (300) can add an output point based on a previous output pattern (120) to update the output pattern (120) to be more precise and accurate. The update can be associated with the adjustment of the width (ΔL) of the hysteresis band centered on the limited output (PR).

For example, in a first output limit situation, a first hysteresis band having a first width (ΔL1) with BU1 as the upper limit and BU2 as the lower limit can be set. The first output pattern (120) can have Pn as its final output point. That is, in the first output limit situation, the output point Pn belongs to the first hysteresis band, and the output point calculation is terminated. In this case, the voltage of the final output point (Pn) becomes the limited voltage, i.e., the final voltage control value of the first output limit situation.

A second output limit situation may be a case of using a previously calculated output pattern (120) according to a new output limit after the first output limit situation, or a case where parameter conditions such as solar irradiance (I), limited output (PR), etc., change from the first output limit situation.

In the second output limit situation, the output pattern (120) judged to be similar by pattern comparison can have Pn as the final output point. At this time, if the first hysteresis band is maintained, the output pattern with Pn as the final output point can be used as is, and control can be performed with the voltage of Pn.

For example, when updating the output pattern (120), the band can be changed from the first hysteresis band to a second hysteresis band. Accordingly, the output point Pn may no longer be included in the second hysteresis band. An output point Pn+1 may be added according to the algorithm of the pattern calculation unit (100).

The output point Pn+1 is included within the second hysteresis band, and the pattern calculation can be terminated. The output point Pn+1 becomes the final output point, and the voltage of the output point Pn+1 becomes the final control voltage.

The first output pattern is updated to a second output pattern where the Pn+1 output point is added, with the final output point changed from Pn to Pn+1. Therefore, the second output pattern is updated to be more refined/accurate to the actual PV graph of the solar power generation facility than the first output pattern.

In FIGS. 10 to 13B, one embodiment of the calculation step (S100) of the present invention is described, and the output pattern (120) calculated accordingly is described.

Figure 10:
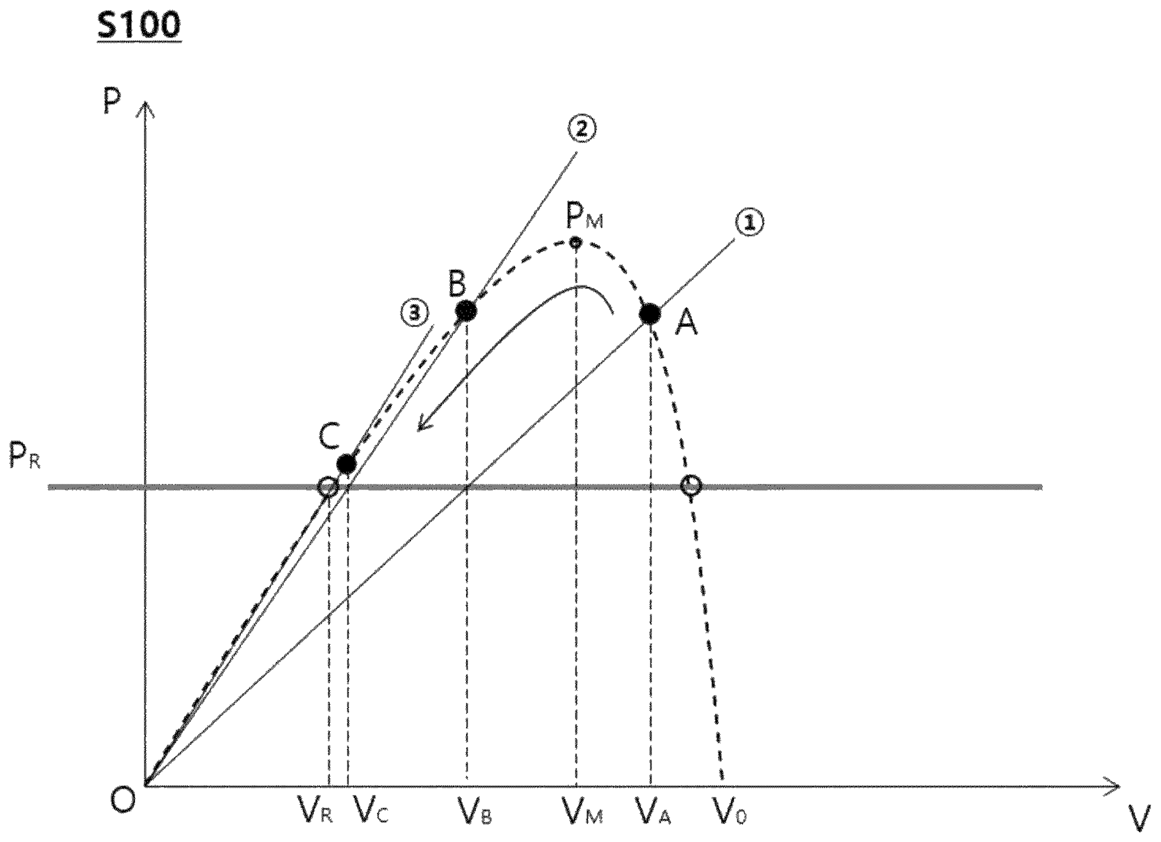
FIGS. 10 and 11 are one embodiment of calculating the output pattern of the present invention.

In FIG. 10, the pattern calculation unit (100) sets the reference point included in the output pattern (120) as the origin (0), draws a first line (①) connecting the current output point (A) and the origin (0), and can calculate a first intersection point between the limited output line (PR) and the first line (①). When adjusting to the voltage (VB) of the first intersection point, the output point B that is output can be obtained. It draws a second line (②) connecting the origin (0) and the output point B, and can calculate a second intersection point between the limited output line (PR) and the second line (②). When adjusting to the voltage (VC) of the second intersection point, the output point C that is output can be obtained. Again, it draws a third line (③) connecting the origin (0) and the output point C, and can calculate a third intersection point between the limited output line (PR) and the third line (③).

In this way, the pattern calculation unit (100) can calculate output points (B, C) that approach the limited output point (VR, PR) from the current output point (A). It can be seen that output points are calculated between the current output point (A) and the reference point (0), and they get closer to the limited output point as they go from output point A to the final output point (C). From this, the embodiment of FIG. 10 can include all the features of the output pattern (120) of the present invention.

Figure 11:
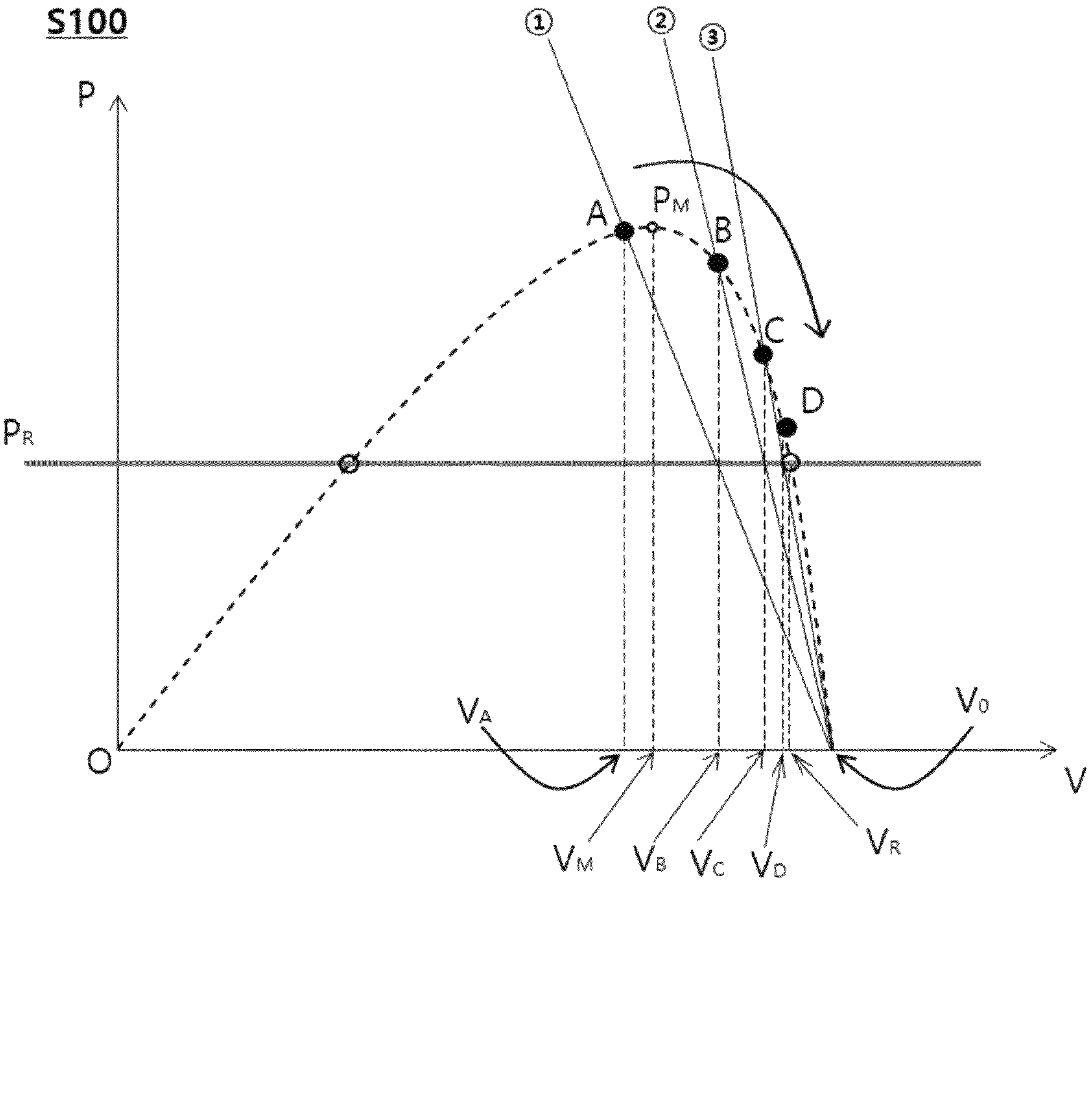

The embodiment of FIG. 11 uses the same output point calculation algorithm as the embodiment of FIG. 10. The only difference from FIG. 10 is that the reference point is the open-circuit voltage (Vo). Similar to FIG. 10, it finds the intersection point of a line connecting the output point and the reference point with the limited output line (PR). It obtains the output point corresponding to the voltage of that intersection point, and then can find the intersection point of a line connecting the newly obtained output point and the reference point (Vo) with the limited output line (PR).

In the case of FIG. 10, regardless of the location of the current output point (A) (e.g., regardless of being to the left or right of the maximum power point (VM, PM)), it obtains the output points that track the left-side limited output point. In the case of FIG. 11, regardless of the location of the current output point (A) (e.g., regardless of being to the left or right of the maximum power point (VM, PM)), it can obtain the output points that track the right-side limited output point.

According to the output point calculation algorithm using a line passing through such an output point, the repeatedly calculated output points (B, C, D, etc.) can gradually converge to the limited output point (VR, PR). To reach the exact limited output point (VR, PR), a mathematically infinite process is required, so by introducing a hysteresis band, the repeated calculation can be stopped in an appropriate range that satisfies the output limit command.

Figure 12:
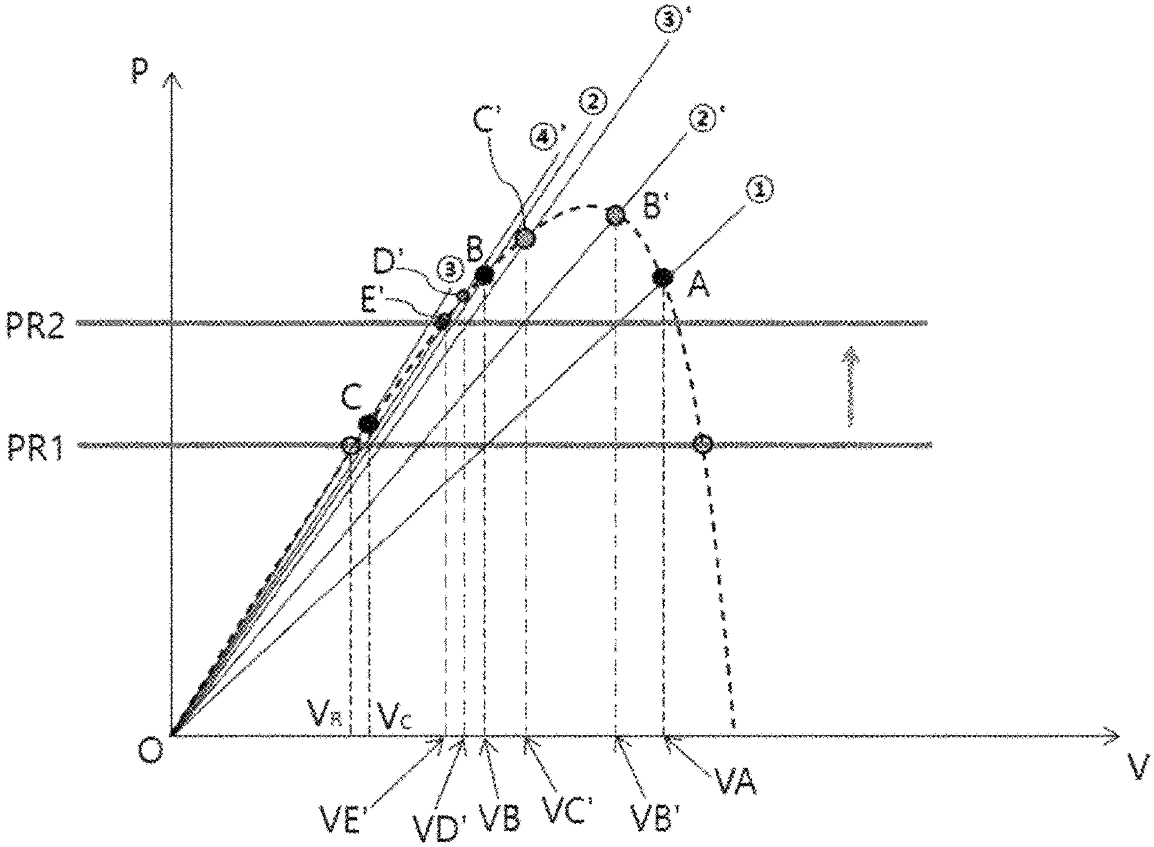
FIG. 12 is an explanatory diagram for the case where the limited output changes in the embodiment of FIG. 10.
Figure 13A:
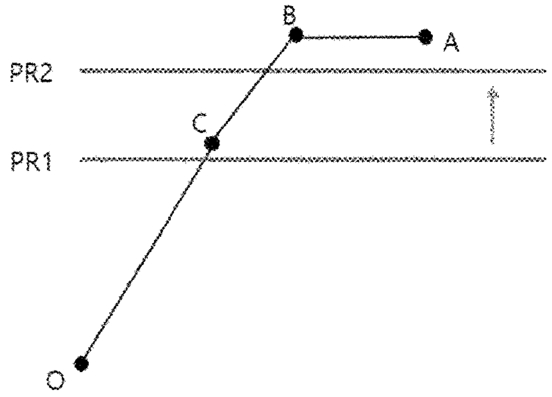
FIGS. 13A and 13B are an explanatory diagram of the difference in the output pattern from FIG. 12.
Figure 13B:
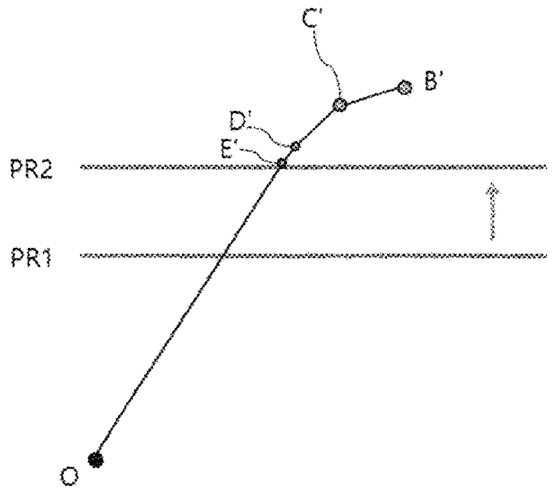

In FIGS. 12 to 13B, the parameters that affect the output pattern (120) of the present invention are described. The core comparison of the output pattern (120) is ultimately a comparison between the shapes of the output pattern (120). The main parameters that affect the shape of this output pattern (120) can include the solar irradiance (I) or the limited output (PR).

For example, using FIG. 12, the effect of changes in the limited output (PR) on the output pattern (120) is described. The algorithm described in FIGS. 10 and 11, which uses a line passing through an output point to obtain the output points that constitute the output pattern (120), is used. The discussion here can be similarly applied to the solar irradiance (I) parameter (FIG. 3).

The output patterns (120) for a first limited output (PR1) and a second limited output (PR2) are compared. At this time, the solar irradiance (I) is described as a fixed case for convenience.

For the first limited output (PR1), the first output pattern can calculate output points (B, C) between the current output point (A) and the reference point (0), using the intersection of the line connecting the output point and the reference point (0) with the limited output line (PR1).

At this time, if the limited output changes to a second limited output (PR2), a second output pattern with a completely different shape from the first output pattern is formed. That is, output point B of the first output pattern is changed to output point B' by line ②', and output point C of the first output pattern is changed to output point C' by line ③'.

For a hysteresis band with the same width, output points D', E', which did not need to be additionally calculated in the first output pattern, may need to be added after C' in the second output pattern.

From this, in FIGS. 13A and 13B, as the limited output (PR) differs, the number of output points calculated for a hysteresis band with the same width also differs, and the shape near each final output point (C and E') is also completely different. From this, the limited output (PR) is one of the main parameters affecting the shape of the output pattern (120).

Figure 14:
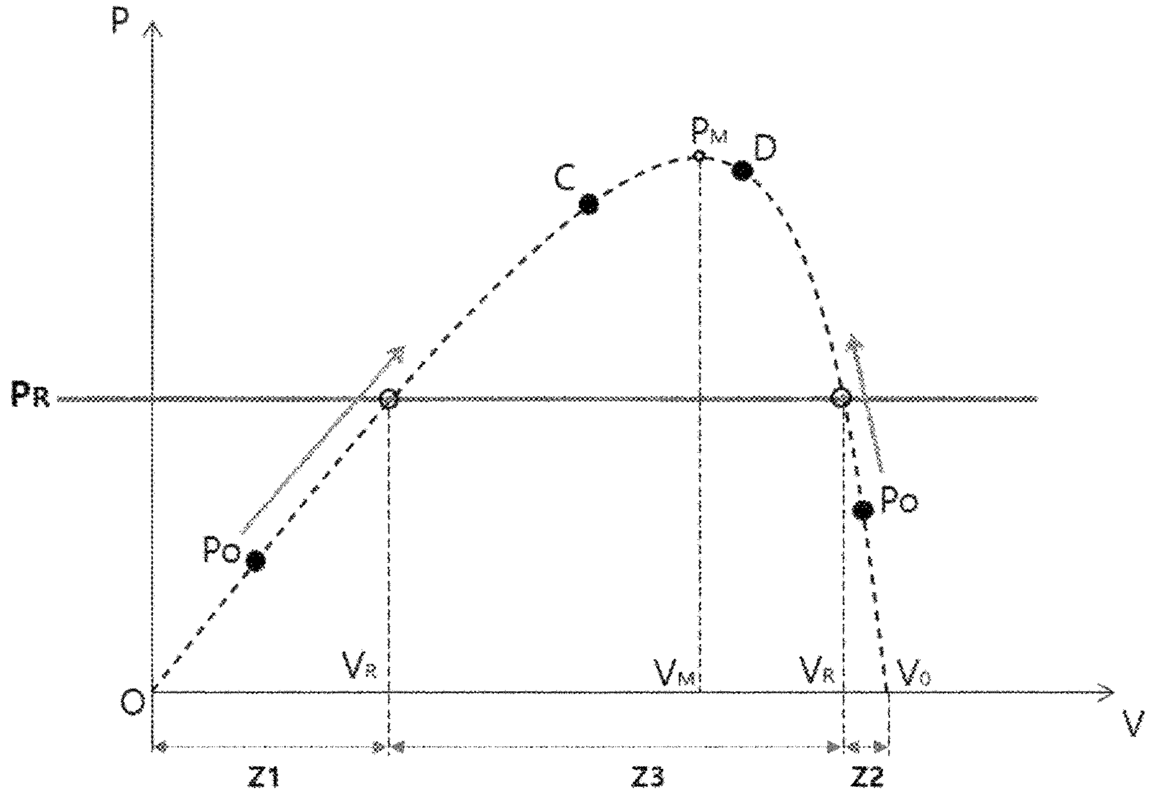
FIGS. 14 and 15 are one embodiment of the pattern calculation of the present invention.
Figure 15:
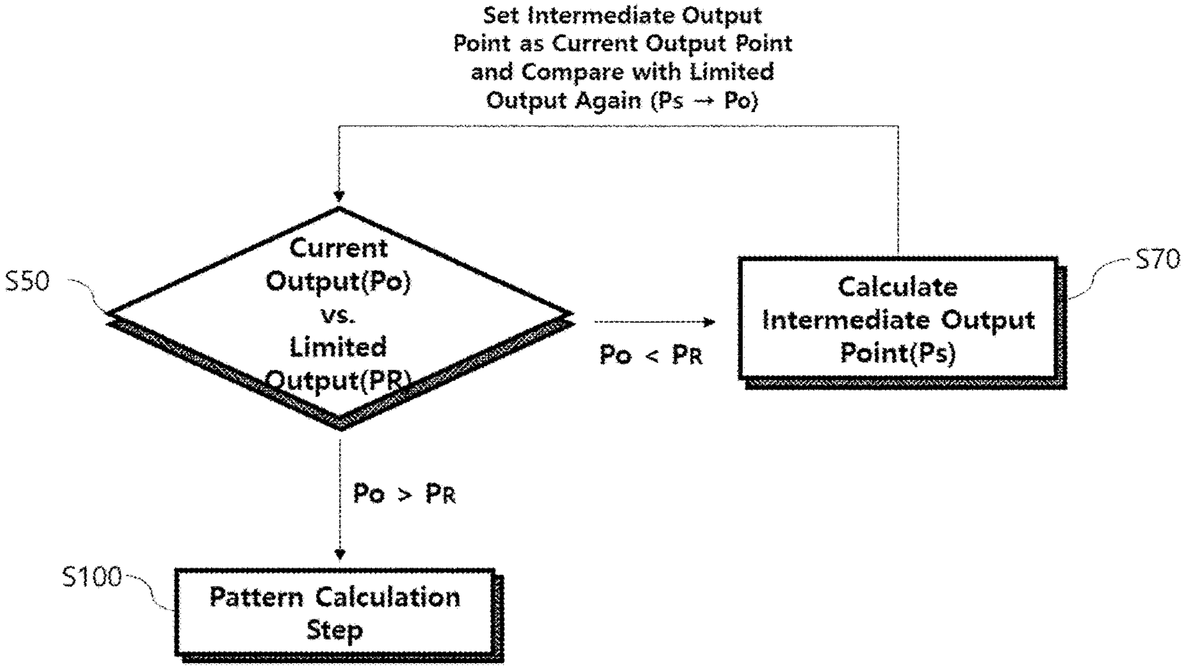

According to FIGS. 14 and 15, a method for handling an output point having a lower output (power) than the limited output (PR) before the pattern calculation (S200) of the present invention is described.

Theoretically, there is no special limit on the location of the current output point (Po), and it can be tracked to the limited output point regardless of its location by the output point calculation algorithm of the pattern calculation unit (100).

Meanwhile, in the case of the embodiments of FIGS. 10 and 11, when calculating an output point using the intersection of a line passing through a reference point and an output point with the limited output line (PR), it may be difficult to apply this method as is for output points having a lower power than the limited output line (PR).

The current output point will mostly be located at or near the maximum power point (VM, PM), but in special situations such as when the limited output changes instantaneously as in FIG. 12, a case where the current output point is below the limited output (PR) may occur.

As one embodiment to handle this, when the limited output (PR) is set, the voltage range of the solar power facility can be distinguished into a voltage range with lower power than the limited output (PR) and a voltage range with higher power than the limited output (PR). In FIG. 14, the voltage range with lower power than the limited output (PR) is the first voltage range (Z1) and the second voltage range (Z2), and the voltage range with higher power than the limited output (PR) can be the third voltage range (Z3). It is preferable that the third voltage range (Z3) includes the maximum power point (MPP). This may be related to the unique shape of the PV graph of the solar power generation facility.

In FIG. 15, a method is disclosed for moving the current output point (Po) located in the voltage range with lower power than the limited output (PR) to an output point in the voltage range with higher power than the limited output (PR) (e.g., output point C and output point D).

The voltage control method of the present invention may include an output comparison step (S50) or an intermediate output point calculation step (S70).

In the output comparison step (S50), the pattern calculation unit (100) or the control unit (500) compares the output (Po) of the current output point with the limited output (PR). If the output (Po) of the current output point is greater than the limited output (PR) (Po>PR), it proceeds to the pattern calculation step (S100). If the output (Po) of the current output point is smaller than the limited output (PR) (Po<PR), the intermediate output point calculation step (S70) can be performed.

In the intermediate output point calculation step (S70), the pattern calculation unit (100) or the control unit (500) can calculate an intermediate output point (Ps) located in the voltage range (third range (Z3)) with higher output/power than the limited output (PR). The intermediate output point (Ps) is calculated by methods such as averaging the voltage of the current output point (Po) and the voltage of the maximum power point (PM), or by giving more weight to the maximum power point (PM) to make it an output point closer to the maximum power point (PM) among the voltages between the voltage of the current output point (Po) and the maximum power point (PM). The method is not limited to necessarily using the maximum power point (PM).

When the intermediate output point (Ps) is calculated (S70), that intermediate output point (Ps) is then set as the current output point of the pattern calculation unit (100), and the pattern calculation algorithm can be applied as is.

Through the output comparison step (S50) and the intermediate output point calculation step (S70), the current output point (Po) located in the voltage range with lower power than the limited output (PR) is moved to an output point in the voltage range with higher power than the limited output (PR), and then the aforementioned pattern calculation step (S100) can be started.

What is claimed is:

1. A voltage control device for solar power generation in an output limit situation, comprising:
- a pattern calculation unit configured to perform an algorithm to calculate output points adjacent to a limited output (PR) from a current output point of the solar power generation facility, and to calculate an output pattern comprised of the output points;
- a voltage adjustment unit configured to control a terminal voltage of a solar panel with the voltage of a final output point of the output pattern; and
- a pattern comparison unit configured to compare output patterns to present a past output pattern that is most similar to a current output pattern,
- wherein a limited voltage corresponding to the limited output (PR) is either immediately provided based on a previously calculated the output pattern, or is obtained by adding output points by the pattern calculation unit based on a previously calculated the output pattern, and
- the output pattern is a topological pattern including a graph comprised of nodes, which are output points, and edges connecting the nodes, or a polygon comprised of vertices, which are output points, and sides connecting the vertices.

2. The voltage control device of claim 1, further comprising a pattern update unit configured for adding output points based on a previously calculated output pattern to update the output pattern to be more consistent with a unique power-voltage graph of the corresponding solar power generation facility.

3. The voltage control device of claim 1, wherein the output pattern forms a 3D curved surface with Power (P)-Voltage (V)-Solar Irradiance (I) as axes.

4. The voltage control device of claim 1, wherein the pattern calculation unit is configured to form the output pattern by a method of: finding an intersection point of a line connecting the output point and a reference point with a limited output line (PR); finding an output point corresponding to the voltage of that intersection point; and then repeatedly finding an intersection point of a line connecting the newly found output point and the reference point with the limited output line (PR).

5. The voltage control device of claim 1, wherein the pattern calculation unit is configured to calculate an output point that is closest to the limited output (PR) using a current output point and a reference point, and that output point becomes a component of the output pattern.

6. The voltage control device of claim 1, wherein the pattern comparison unit is configured to compare output patterns under a specific parameter condition including solar irradiance to find the most similar output pattern and by concentrating more on an adjacent region of a final output point of the output pattern.

7. The voltage control device of claim 1, wherein the voltage control device is configured to introduce a hysteresis band centered on the limited output (PR), and set a width of the hysteresis band to a maximum width that satisfies a limited output condition.

8. The voltage control device of claim 1, wherein a pattern update unit is associated with a hysteresis band centered on the limited output (PR), and induces the calculation of a new output point from an existing output pattern by varying a width ($\Delta L$) of the hysteresis band for the output pattern.

9. The voltage control device of claim 1, wherein the voltage control device is configured to move a current output point (Po) of the output pattern located in a voltage region with power lower than the limited output (PR) to an output point in a voltage region with power higher than the limited output (PR).

* * * * *